United States Patent [19]

Oyoun

[11] 3,861,441
[45] Jan. 21, 1975

[54] PNEUMATIC TIRE BREAKER ASSEMBLY

[75] Inventor: Sami Oyoun, Aachen, Germany

[73] Assignee: Uniroyal Aktiengesellschaft, Aachen, Germany

[22] Filed: May 24, 1974

[21] Appl. No.: 473,094

[30] Foreign Application Priority Data
July 20, 1973  Germany.............................. 2336962

[52] U.S. Cl......................... 152/361 R, 152/361 FP
[51] Int. Cl.............................................. B60c 9/18
[58] Field of Search ........... 152/330, 354, 355, 356, 152/357, 358, 359, 360, 361 R, 361 FP, 361 DM, DIG. 19

[56] References Cited
FOREIGN PATENTS OR APPLICATIONS
1,494,766   9/1967   France .......................... 152/361 FP
1,044,649   12/1957  Germany...................... 152/361 FP

*Primary Examiner*—Stanley H. Tollberg
*Assistant Examiner*—Larry H. Martin
*Attorney, Agent, or Firm*—Philip Sands, Esq.

[57] ABSTRACT

A pneumatic tire and a breaker assembly therefor, the breaker assembly being interpositioned between the carcass of the tire and a tread overlying the crown region of the carcass, is disclosed. The breaker assembly includes a pair of plies one of which plies is folded to present three continuous ply layers. Two of the ply layers, via confronting fold regions, are divided to define an annular gap in the breaker assembly which is bridged by the other of the plies.

13 Claims, 8 Drawing Figures

PNEUMATIC TIRE BREAKER ASSEMBLY

BACKGROUND OF THE INVENTION

The present invention relates generally to pneumatic tires for vehicles. More particularly the invention relates to tread reinforcements or breaker assemblies for pneumatic tires, and preferably for those tires of the "radial" or "radial ply" variety.

The expressions "radial tires" and "radial ply tires" as commonly used in the pneumatic tire art may be said to include various tire constructions having a carcass or body comprising one or more reinforcement plies or weftless cord fabric extending from bead to bead wherein the cords in each ply are substantially radial in orientation, i.e. the cords are oriented substantially normal to the beads and the crown centerline of the tire.

Such radial tires are usually provided with a reinforcement or breaker assembly which generally comprises one or more belts or plies interposed between the tread and the crown region of the carcass. The belt or belts are usually constituted or rubberized, weftless cord fabrics. The cords are generally comprised of inextensible material, such as, for example, metallic wires, glass filaments, polyester filaments, etc. The cords are parallel to each other and are oriented at a low bias angle, i.e. they are oriented substantially parallel to the bead planes and thus circumferentially of the tire. In the case of a monoply breaker assembly, the bias angle is approximately 0°, but in the most usual instances, where the breaker is a multiply structure, the cords are oriented at a low bias angle ranging up to approximately 10° relative to the median circumferential or equatorial plane of the tire.

In those instances wherein the breaker assembly is comprised of at least two plies, the plies may be flat (unfolded) or, alternatively, at least one of the plies may be folded adjacent to the shoulder regions of the tread. It has been determined that by folding at least one of the plies in the manner aforementioned, the tread shoulders are reinforced and strengthened thereby. As a further result, the tire demonstrates more desirable road behavior, an increase in stability, and a reduced rate of tread wear.

However, due to conventional construction and design of such folded breakers, tires equipped with same demonstrate, at high speeds, edge separation of the belts in the vicinity of the circumferential fold regions of the breaker assembly, as well as separation of the free end at each fold region from the remainder of the folded ply. As a result, the belts tend to move slightly relative to one another and/or relative to the carcass and tread, and due to friction tend to generate a substantial amount of heat. Heat build-up results in increased tread wear and in unstable road behavior of the tire.

Examples of conventional folded breaker constructions or designs are found in French Patent No. 1,228,241 in which there are disclosed 15 different breaker designs. In each instance, the marginal edges of the folded ply or belt are not optimumly anchored either by a cooperating unfolded ply or by adjoining regions of the folded ply itself in contact with the marginal edges of that folded ply.

Another type of conventional breaker construction is illustrated in German Patent No. 1,044,649. The breaker construction disclosed therein is such that in cross-section it presents a plurality of zig-zag folds in the vicinity of the tread shoulders, each fold portion or layer in succession decreasing in axial extent in the form of steps. The continuous fold layers terminate in a free marginal edge which is exposed relative to the tread. The lowermost ply layer, or web, which medially interconnects the folded step-like layers is not reinforced and, therefore, is highly yieldable or bendable relative to the more rigid shoulder areas of the breaker at which are disposed the folded step-like layers. As a result, the medial web portion of the breaker is apt to bend easily when subjected to intensified vibrations and shock, thereby subjecting the medial portion of the tread to a greater rate of wear than the shoulders of the tread.

SUMMARY OF THE INVENTION

Accordingly, it is an object of the present invention to provide an improved folded breaker assembly for pneumatic tires, and preferably for pneumatic tires of the radial variety, which is so constructed and designed that it optimumly resists separation of the folded regions of each ply member thereof, optimumly resists edge separation of the breaker plies relative to one another, and is uniformly rigid substantially throughout its axial extent so as not to bend excessively in one region thereof relative to any other region thereof.

To the above ends, and with other objects and advantages in view as will become apparent hereinafter, the present invention relates to a breaker assembly for a pneumatic tire, the breaker assembly being interpositioned between the carcass of the tire and a tread overlying the crown region of the carcass. The breaker assembly comprises a pair of plies at least one of which is folded. The folded ply includes two pairs of opposing fold regions, each pair of fold regions including an axially outer fold and an axially inner fold. Each axially inner fold is spaced proximate to the other and defines therewith an annular gap which is bridged by the other of the plies. The folded ply also terminates in a pair of axially opposite marginal edges each of which is concealed between the axially inner fold and the axially outer fold of its corresponding pair of fold regions.

BRIEF DESCRIPTION OF THE DRAWINGS

The present invention will be more clearly understood from the following detailed description thereof when read in conjunction with the accompanying drawings, wherein.

DETAILED DESCRIPTION OF THE INVENTION

Figure 1:
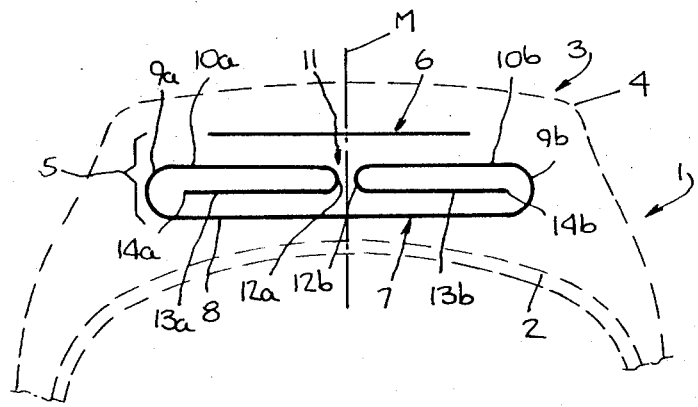
FIG. 1 is a cross-sectional view of a pneumatic tire shown in broken line, and of one embodiment of the breaker assembly pursuant to the present invention confined in the pneumatic tire.

Referring now to the drawings and more particularly to FIG. 1, there is illustrated a pneumatic tire denoted generally by reference character 1. The tire 1 has a carcass 2, preferably a radial ply carcass, and a tread 3 overlying the crown region of the carcass 2. The tread 3 is provided with axially separated shoulder regions 4 which merge with the opposite sidewalls of the carcass 2. Interpositioned between the carcass 2 and the tread 3 is a breaker assembly pursuant to one embodiment of the present invention and denoted generally by reference character 5. The breaker assembly 5 includes an unfolded or flat ply 6 and a folded ply 7.

The folded ply 7 includes a medially disposed web 8 which has an axial extent substantially coextensive with the axial extent of the tread 3 between the shoulder region 4 of the latter. The web 8 constitutes a first ply layer which is continuous, via a pair of axially outer fold regions 9a and 9b, with a pair of second ply layers 10a and 10b. The ply layers 10a and 10b are continuous, via a second pair of axially inner fold regions 12a and 12b, with still a further pair of ply layers 13a and 13b.

The ply layers 13a and 13b are interpositioned between and concealed by the web 8 and the ply layers 10a and 10b. The fold regions 12a and 12b are closely spaced one another and define an annular gap 11 therebetween. The ply layers 13a and 13b terminate respectively in a pair of axially opposite marginal edges 14a and 14b. The unfolded ply 6 directly confronts and bridges the annular gap 11, and surrounds the folded ply 7.

It will be understood, that in this embodiment, as well as the other embodiments as will be described below, the unfolded ply 6 is always provided with an axial extent which is greater than the axial extent of the gap 11 in the folded ply 7. In the instant embodiment of FIG. 1, the entire breaker assembly 5 is symmetrically disposed relative to the median equatorial plane M of the tire 1.

Figure 2:
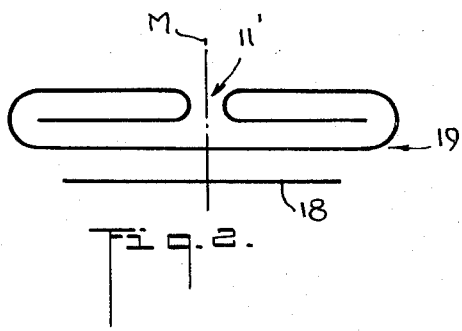
FIGS. 2 through 8 are respective schematic cross-sectional views of seven additional embodiments of the breaker assembly pursuant to the present invention.

FIG. 2 illustrates a second embodiment of the breaker assembly pursuant to the present invention, the unfolded ply in this instance being denoted generally by the reference character 18 and the folded ply by the reference character 19. The distinction between the embodiment of FIG. 2 with that of the embodiment of FIG. 1, is that in FIG. 2 the embodiment is so constructed that the folded ply 19 overlies and surrounds the unfolded ply 18. The unfolded ply 18 may be considered as bridging the annular gap 11' in the folded ply 19, but is separated from the gap 11' through the intermediary of the central web of the folded ply 19.

Figure 3:
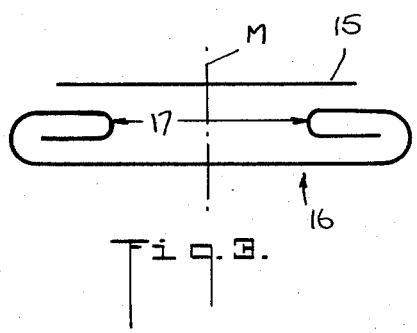

FIG. 3 illustrates a third embodiment of the breaker assembly pursuant to the present invention. In this instance, the unfolded ply 15 overlies and surrounds the folded ply 16 as in the embodiment of FIG. 1, but the gap 17 in the folded ply 16 has a much greater axial extent than does the gap 11 in the embodiment of FIG. 1. This type of breaker construction has greater utility in passenger tires for purposes of providing for a more resilient and comfortable ride. This is due to the widened gap 17 which provides for greater resiliency in the central region of the carcass crown. Yet, because of the relationship therewith of the unfolded ply 15 which bridges the gap 17, there is sufficient rigidity in the breaker assembly to optimize tire stability when "cornering" at high speeds.

Figure 4:
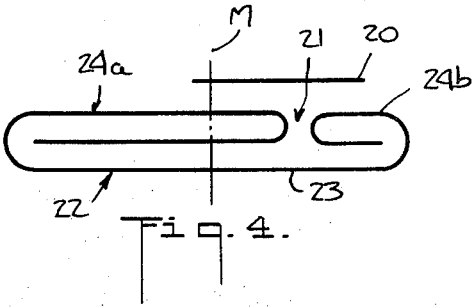

FIG. 4 illustrates a fourth embodiment of the breaker assembly pursuant to the present invention. In this instance, the unfolded breaker 20 directly confronts and surrounds the annular gap 21 in the folded breaker 22 as in the embodiment of FIG. 1, but the annular gap 21 is asymmetrically disposed relative to the median equatorial plane M of the tire. Thus, although the radially innermost ply layer or web 23 of the folded ply 22 is provided with an axial extent which corresponds to that of the tread 3, the radially outermost ply layers 24a and 24b which lie in a mutual circumferential plane have different axial extents relative to one another. In this embodiment it is preferred that the axial extent of the unfolded ply 20 be sufficient to at least in part cross beyond median equatorial plane M of the tire while bridging the gap 21 in the folded ply 22.

Figure 5:
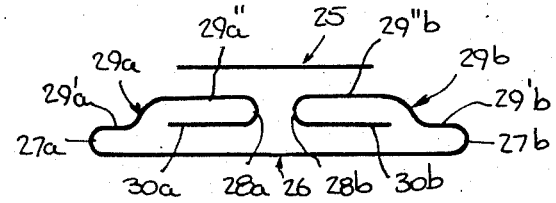

FIG. 5 illustrates a fifth embodiment of the breaker assembly pursuant to the present invention. In this instance, an unfolded breaker 25 overlies and surrounds a folded breaker 26. The folded breaker 26 is provided with a pair of axially outer fold regions 27a and 27b and a pair of confronting axially inner fold regions 28a and 28b. Between the axially outer fold region 27a, 27b and the axially inner fold region 28a, 28b there is provided a ply layer which is bent at 29a, 29b to present two ply layer portions. One of the portions 29'a, 29'b lies in a common circumferential plane with a concealed ply layer 30a, 30b which is interpositioned between the radially outermost ply layer portions 29"a, 29"b of the aforementioned bent ply layer and the radially innermost ply layer or central web of the folded ply 26. The ply layer portions 29"a, 29"b are substantially spanned by the axial extent of the unfolded ply 25. This particular breaker construction emphasizes reinforcement in the central region of the carcass crown.

Figure 6:
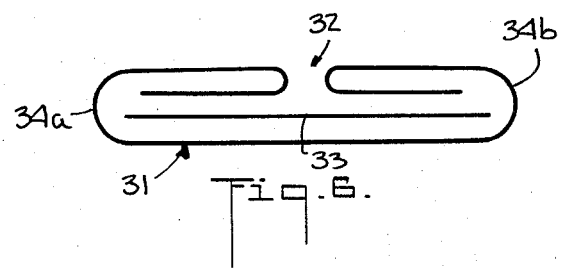

A sixth embodiment of the breaker assembly pursuant to the present invention is illustrated in FIG. 6. In this instance, the folded ply 31 is provided with an annular gap 32 which is directly confronted by an unfolded ply 33 situated within the confines of the fold regions 34a and 34b of the folded ply 31. Thus, rather than surrounding the folded ply 31, or being surrounded by the latter, the unfolded ply 33 is substantially enveloped by the three ply layers of the folded ply 31.

Figure 7:
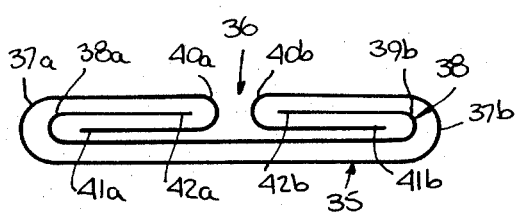

A seventh embodiment of the breaker assembly pursuant to the present invention is illustrated in FIG. 7. The embodiment of FIG. 7 is substantially identical to that of the embodiment of FIG. 6. with regard to the concept of enveloping one ply in a second. The embodiment of FIG. 7 is therefore a variant of the embodiment of FIG. 6. In this instance, however, both of the plies are folded. One of the plies, namely ply 35, is substantially identical to the folded plies of the aforementioned embodiments of FIGS. 1–6 and is provided with an annular gap 36. The ply 35 is provided with a pair of axially outer folds 37a and 37b, and a pair of axially inner folds 40a and 40b, the latter which define the annular gap 36. The other of the plies, namely ply 38, is substantially longer than the ply 33 of the embodiment of FIG. 6 and is provided with a pair of axially outer folds 39a and 39b. The ply 38 terminates in a pair of axially inner marginal edges 42a and 42b which extend adjacent to the folds 40a and 40b, respectively, in the ply 35. This type of breaker construction is particularly sturdy and more rigid than the aforementioned embodiments of FIGS. 1–6, and is desirable in tires utilized particularly for high speed driving.

Figure 8:
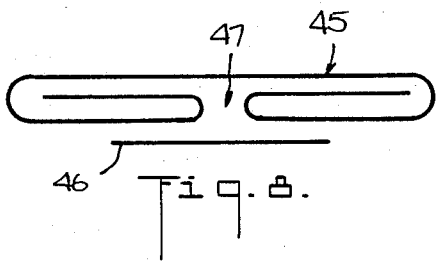

FIG. 8 illustrates an eighth embodiment pursuant to the breaker assembly of the present invention. In this embodiment the folded breaker 45 surrounds the unfolded breaker 46, the latter which confronts an annular gap 47 in the folded breaker 45. Moreover, in this instance, the annular gap 47 is directed radially inwardly of the tire carcass, thereby differing from the radially outward relationship of the annular gap in the embodiments of FIGS. 1–7.

Although the various breaker constructions of FIGS. 1–8 are similar to one another in concept, each has a slightly differing effect on tire behavior, stability and riding comfort. The symmetry and/or asymmetry of each breaker construction can be altered from that disclosed by utilizing plies of the same or different materials, and ply-reinforcing cords of the same or different materials. The cords, for example, may be metallic such as, for example, steel, or non-metallic such as, for example, polyamide or polyester filaments or fibers.

It will be understood that the foregoing description of preferred embodiments of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. A pneumatic tire comprising a carcass having a circumferential crown region, a tread overlying said crown region, and a breaker assembly interposed between said tread and carcass, said breaker assembly comprising a pair of plies at least one of which is folded, said folded ply including two pairs of opposing fold regions, each pair of said fold regions including an axially outer fold and an axially inner fold, each said axially inner fold being spaced proximate to the other said axially inner fold to define an annular gap therebetween, the other of said plies being superposed upon said folded ply and having an axial extent sufficient to bridge said annular gap, said folded ply terminating in a pair of axially opposite marginal edges each of which is concealed between the axially inner fold and the axially outer fold of its corresponding pair of fold regions.

2. A pneumatic tire as claimed in claim 1, wherein each of said pairs of opposing fold regions in cross-section defines three circumferential ply layers axially continuous with one another, one of said ply layers being interposed between the other two ply layers and terminating in a corresponding one of said marginal edges.

3. A pneumatic tire as claimed in claim 2, wherein said annular gap has an axial extent which is less than the axial extent of said one of said ply layers which is interposed between the other two ply layers.

4. A pneumatic tire as claimed in claim 2, wherein said annular gap has an axial extent which is greater than the axial extent of said one of said ply layers which is interposed between the other two ply layers.

5. A pneumatic tire as claimed in claim 2, wherein said annular gap is symmetrically disposed relative to a median equatorial plane of said breaker assembly.

6. A pneumatic tire as claimed in claim 2, wherein said annular gap is asymmetrically disposed relative to a median equatorial plane of said breaker assembly.

7. A pneumatic tire as claimed in claim 2, wherein said other of said plies directly confronts said annular gap of said folded ply.

8. A pneumatic tire as claimed in claim 7, wherein said other of said plies surrounds said folded ply.

9. A pneumatic tire as claimed in claim 7, wherein said folded ply surrounds said other of said plies.

10. A pneumatic tire as claimed in claim 7, wherein said other of said plies directly confronts said one of said ply layers of said folded ply which is interposed between the other two ply layers of said folded ply.

11. A pneumatic tire as claimed in claim 10, wherein said other of said plies is also folded and presents a pair of axially opposite fold regions each of which is proximate to a corresponding one of said axially outer folds of the first said folded ply, the second said folded ply circumferentially embracing via at least one of its fold regions said one ply layer of the first said folded ply which is interposed between the other two ply layers of the first said folded ply.

12. A pneumatic tire as claimed in claim 7, wherein a second one of said ply layers which interconnects the first said one of said ply layers with the remaining ply layer is bent such that only a portion thereof lies in the same circumferential plane as the first said one of said ply layers and is spaced from said corresponding one of said marginal edges.

13. A pneumatic tire as claimed in claim 2, wherein said other of said plies is separated from said annular gap by one of the other two ply layers between which is interposed said one of said ply layers.

* * * * *